United States Patent [19]

Mori

[11] Patent Number: 4,754,268
[45] Date of Patent: Jun. 28, 1988

[54] WIRELESS MOUSE APPARATUS
[75] Inventor: Akira Mori, Osaka, Japan
[73] Assignee: Mitsuboshi Belting Ltd., Kobe, Japan
[21] Appl. No.: 768,737
[22] Filed: Aug. 23, 1985
[30] Foreign Application Priority Data Oct. 23, 1984 [JP]  Japan ............................... 59-214663

[51] Int. Cl.[4] .............................................. G09G 1/00
[52] U.S. Cl. .................................... 340/710; 340/706; 178/18; 455/100; 455/125; 455/128
[58] Field of Search ...................... 340/710, 709, 706; 178/18; 273/148 B; 235/472; 455/100, 120, 125, 128, 95, 119, 603

[56]  References Cited

U.S. PATENT DOCUMENTS

| | | | |
|---|---|---|---|
| 2,955,777 | 10/1960 | Null et al. .............................. | 244/14 |
| 3,289,001 | 11/1966 | Wilcox ................... | 250/199 |
| 3,541,541 | 11/1970 | Engelbart ............................. | 340/324 |
| 3,588,858 | 6/1971 | Demuth ............... | 455/100 |
| 3,732,557 | 5/1973 | Evans et al. ..................... | 340/324 R |
| 3,745,466 | 7/1973 | Pisano ..................................... | 455/128 |
| 3,826,900 | 7/1974 | Moellering ........................... | 235/435 |
| 3,835,464 | 9/1974 | Rider ................... | 340/324 A |
| 4,034,983 | 7/1977 | Dash et al. ........................... | 340/706 |
| 4,107,612 | 8/1978 | Leveque ............... | 455/128 |
| 4,264,896 | 4/1981 | Sakarya et al. ................. | 340/167 R |
| 4,303,914 | 12/1981 | Page ..................... | 340/710 |
| 4,327,444 | 4/1982 | Court ................... | 455/100 |
| 4,409,479 | 10/1983 | Sprague et al. ................ | 250/237 G |
| 4,418,277 | 11/1983 | Tremmel et al. ................... | 235/435 |
| 4,509,211 | 4/1985 | Robbins .............................. | 455/603 |
| 4,531,740 | 7/1985 | Green et al. ..................... | 273/148 B |
| 4,578,674 | 3/1986 | Baker et al. ........................... | 178/18 |
| 4,612,668 | 9/1986 | Sarac ................... | 455/128 |

OTHER PUBLICATIONS

IBM Technical Disclosure Bulletin, vol. 28, No. 2, Jul. 1985.
Direction Sensing of Pen Movement; Nassimbene, IBM Tech. Discl. Bull., vol. 8, No. 10, 3/66; p. 1334.
Fink et al., "Electronic Engineers' Handbook".

Primary Examiner—Marshall M. Curtis
Attorney, Agent, or Firm—Wood, Dalton, Phillips, Mason & Rowe

[57]  ABSTRACT

In a computer system comprising a computer having a keyboard, and a display device connected to the computer, an improved position indicator means comprising a mouse having means responsive to movement thereof over a support surface for generating electrical signals indicating the positioning of the mouse, power source means carried by the mouse, circuit means powered by said power source means for generating and transmitting radio signals corresponding to said electrical signal, and processing means associated with said computer for receiving said radio signal and converting said radio signal into a display on said display device positioned corresponding to the positioning of said mouse.

13 Claims, 2 Drawing Sheets

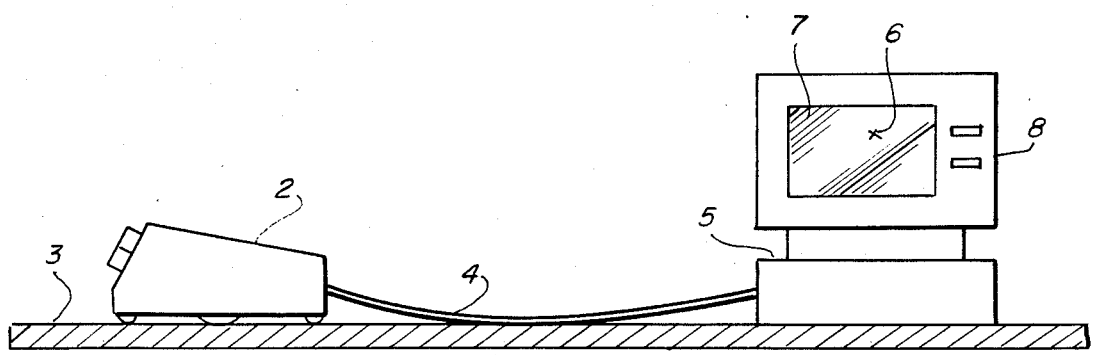
FIG. 3 PRIOR ART
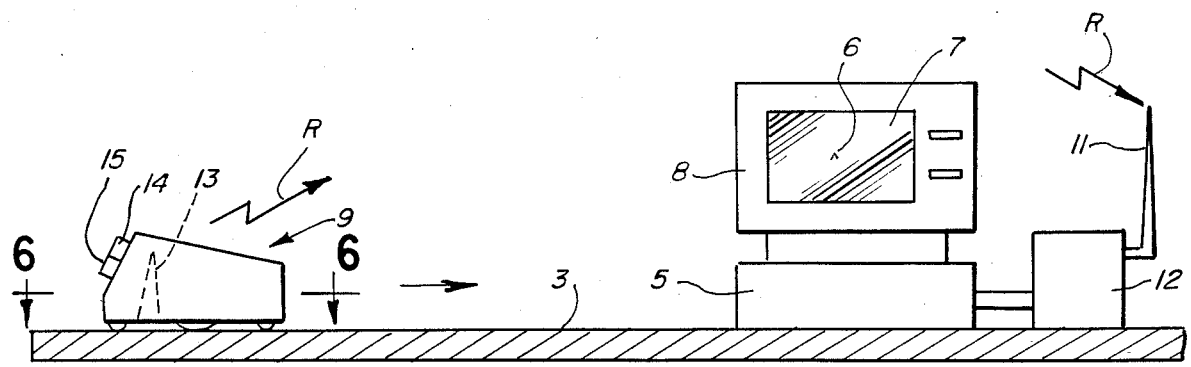
FIG. 4
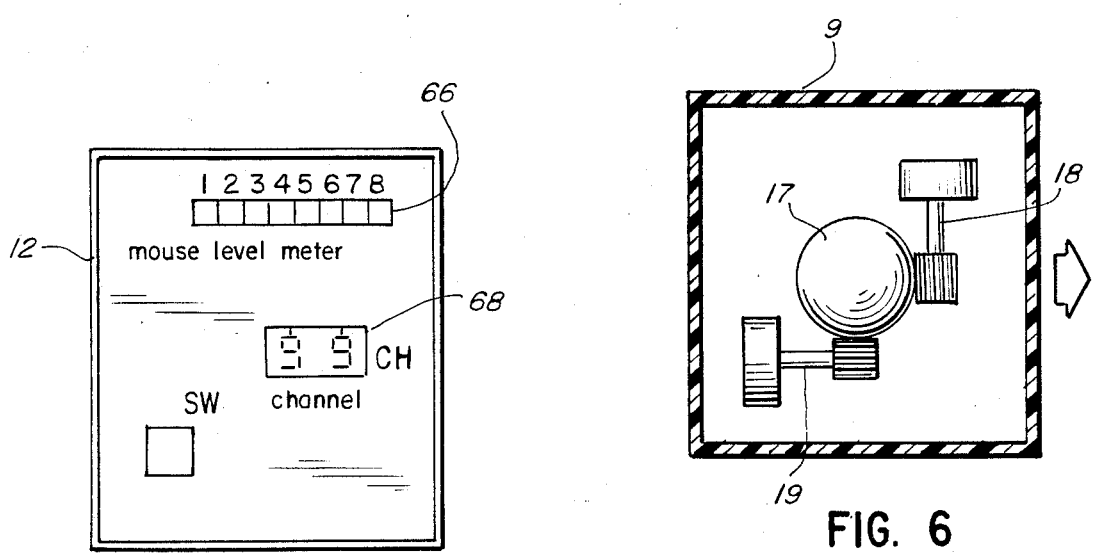
FIG. 5
FIG. 6

WIRELESS MOUSE APPARATUS

Conventional types of such a mouse include a mechanical type and an optical type. The mechanical type mouse is illustrated in FIG. 6 as described in greater detail here following. Briefly the mechanical type mouse includes a longitudinal direction sensor 18 and a lateral direction sensor 19 responsive to revolution of a sensing ball 17 adapted to roll on the subjacent surface. In the optical type mouse, a light emitting diode and a phototransistor are associated with a grid or map to provide a signal corresponding to the distance and direction of movement of the mouse. The conventional mouse, whether it be the mechanical or optical type, is arranged to effect selective positioning of the cursor on the computer monitor screen by output signals coordinated with the state of a control switch for selectively executing a selected function.

The physical connection of the mouse to the host computer by the cable undesirably restricts free movement of the mouse and may effect undesirable movement. Further constant bending or twisting of the cable may effect deterioration thereof so as to result in disconnection or improper contact of connectors at opposite ends of the cable.

Another problem arising from the conventional cable connected mouse is the handiness of the operation. Thus the conventional mouse is arranged for right handed operation rendering it difficult for use by left handed people. While a left handed mouse may be constructed, this requires a special configuration increasing the cost and presenting service and other similar problems. Where a left handed person uses the conventional right handed mouse, the cable is inconveniently disposed and may present interference problems.

Still another problem with the conventional cable connected mouse is the limitation on the relative positioning of the mouse with respect to the host computer occasioned by the innerconnecting wires.

SUMMARY OF THE INVENTION

The present invention comprehends an improved mouse type positioning indicator for use with a computer which eliminates the disadvantages of the above discussed prior art mouse devices in a novel and simple manner.

More specifically the present invention comprehends the provision of a new and improved computer mouse or position indicator, which is arranged to provide indications of the change in positioning of the mouse on a subjacent surface in the form of an electrical signal which is transmitted to the host computer by electromagnetic radiation or radio waves.

The invention further comprehends a provision of power source means within the mouse for operating the radio wave transmitting means.

The invention comprehends that the host computer include radio wave receiving means for receiving and demodulating the transmitted radio wave from the mouse and circuitry for providing the resultant information signal for suitable use by the host computer.

The mouse further includes switch means, the arrangement of which is also transmitted to the host computer for use in controlling the transfer of information.

Coding of the transmitted signal into the necessary format for the specific host computer is effected at the receiver. Illustratively the decoded information may be used to move a cursor on the display screen in correspondence with the movement of the mouse.

A common signal from the switch associated with the mouse or from the input of the keyboard associated with the computer may be utilized in cooperation with the positioning of the cursor so as to permit inputting of desired data to the computer.

Thus more specifically the invention comprehends the provision in a computer system having a host computer including a keyboard and a display device connected to the computer, an improved position indicator means including a mouse having means responsive to movement thereof over a support surface for generating electrical signals indicating the positioning of the mouse, power source means carried by the mouse, circuit means powered by said power source means for generating and transmitting radio signals corresponding to said electrical signal and processing means associated with said computer for receiving said radio signal and converting said radio signal into a display on said display device positioned corresponding to the positioning of said mouse.

Still further the invention comprehends the provision of such an apparatus including a mouse, a transducer for converting the position of the mouse on a subjacent surface into an electric signal indicitive of the position of the mouse, a switch carried by the mouse, radio transmitting means for generating a modulated radio wave signal corresponding to said electric signal and the arrangement of said switch, power source means carried by said mouse, receiving means for receiving and demodulating said signal from the radio transmitting means and means for utilizing the demodulated signal in a computer.

In the illustrated embodiment, the radio wave transmitting means comprises frequency modulating means.

In the illustrated embodiment the apparatus includes means for converting between analog and digital signals.

The invention comprehends providing means for permitting the mouse to transmit on any one of a plurality of different frequencies so as to permit selective use of a number of similar radio wave transmitting mice to different host computers within the same general environmental space.

The computer device position indicator means of the present invention is extremely simple and economical construction while yet providing the highly desirable features discussed above.

BRIEF DESCRIPTION OF THE DRAWING

FIG. 3 is a front elevation of a prior art apparatus;

FIG. 4 is a front elevation of apparatus of the present invention;

FIG. 5 is an elevation of the control panel of the receiver; and

FIG. 6 is a schematic illustration of one form of mouse transducer for use with the present invention.

BEST MODE FOR CARRYING OUT THE INVENTION

Figure 1:
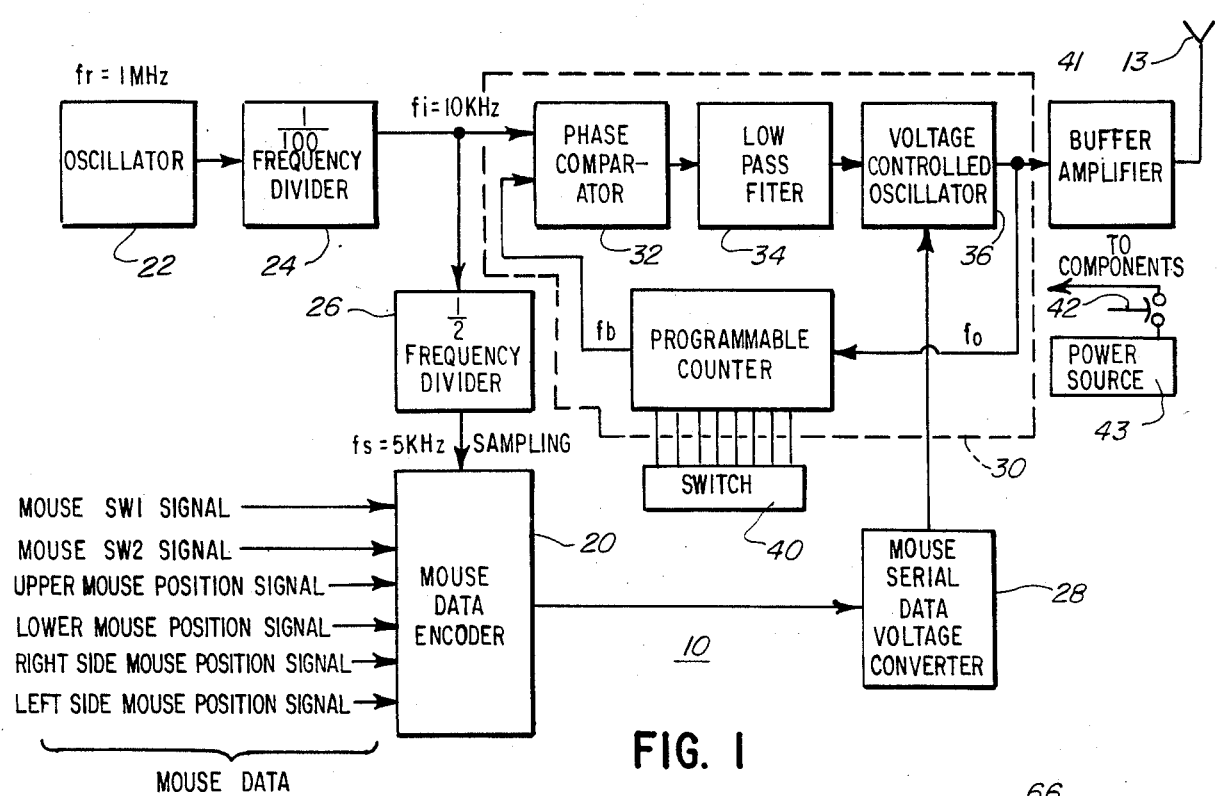
FIG. 1 is a block diagram illustrating circuitry of a mouse.

Referring now to FIG. 3, a conventional mouse 2 is supported upon a subjacent surface 3. The conventional mouse 2 is physically connected by a cable 4 to a host computer 5, and data can be electrically transmitted via a cable 4 between the conventional mouse 2 and the host computer 5. The data is typically utilized to control the position of a cursor 6 on a display 7 of a monitor 8.

Referring now to FIG. 4, a preferred embodiment of the present invention comprises a radio wave mouse (hereinafter mouse) 9 for transmitting data via a radio signal R to a receiving antenna 11 of a receiver 12 connected to the host computer 5. The radio signal R is transmitted from the mouse 9 by means of a transmitting antenna 13 associated with transmitter circuitry 10 contained within the mouse 9.

The radio signal R comprises four position signals consisting of an upper mouse position signal, a lower mouse position signal, a right side mouse position signal and a left side mouse position signal corresponding to movement of the mouse in four orthogonally related directions.

Further, the radio signal R comprises command signals generated in response to actuation of switches 14, 15. Such switches and the use thereof are well known to those skilled in the art.

Referring to FIG. 6, illustrated is a mouse transducer 16 utilized in conjunction with a mechanical type mouse. The mouse transducer 16 comprises a ball 17, a longitudinal direction sensor 18 and a lateral direction sensor 19. Movement of the mouse 5 along the subjacent surface 3 cause the ball 17 to rotate. Rotation of the ball. 17 causes a concurrent rotation of the longitudinal and lateral direction sensors 18, 19. The longitudinal and lateral direction sensors 18, 19 reduce the movement of the mouse 5 into orthogonal components, and values of the orthogonal components comprise the upper, lower, right side and left side position signals.

Referring now to FIG. 1, illustrated is a block diagram of transmitter circuitry 10 contained within the mouse 9. Digital signals generated by the mouse transducer 16 in response to movement of the mouse 9 along the subjacent surface 3, hereinafter collectively referred to as mouse data, are entered to a mouse data encoder 20.

A first oscillator 22 coupled to a first frequency divider 24 generates a first oscillator signal having a frequency of 1 MHz. The first frequency divider 24 reduces the frequency of the first oscillator signal by a factor of 100, generating a first divided signal having a frequency of 10 KHz. A second frequency divider 26 coupled to an output of the first frequency divider 24 divides the first divider signal by a factor of 2, generating a 5 KHz sampling signal.

The mouse data encoder 20 samples the mouse data at a frequency equal to the sampling signal and generates the mouse data as a time division multiplexed, or time series, digital signal to a mouse serial data voltage converter 28.

The transmitter circuitry 10 comprises a phase locked loop type FM transmitter comprising a phase locked loop oscillator 30. The phase locked loop oscillator 30 comprises a phase-comparator 32, a low pass filter 34, a voltage controlled oscillator 36 and a programmable counter 38. The programmable controller operates as a frequency divider, and the division factor is determined by a first switch 40.

A voltage controlled oscillator output signal $f_o$, generated by the voltage controlled oscillator 36 is input to the programmable counter 38 and utilized as a feedback signal. The programmable counter 38 divides the frequency of the voltage controlled oscillator output signal $f_o$. The output of the programmable counter 38 is coupled to the input of the phase-comparator 32. The phase locked loop oscillator 30 operates in a conventional manner and the programmable counter 38 controls the frequency of the voltage controlled oscillator output signal $f_o$. The programmable counter 38 is provided to vary the carrier frequency of the transmitted FM signal so that a plurality of mouses can operate simultaneously at close positions without adversely affecting each other.

It is desired that the transmitting band width be approximately 10 to 20 KHz, the maximum transmitting output power be approximately 1 mW and the maximum usable range from the host computer 8 be approximately 5 meters. Further, a power source such as a chargeable battery (not shown) is preferably contained in the mouse 5.

A power source 43, for example a rechargeable battery, supplies d.c. power to all components of the transmitter circuitry 10. It is desired to provide power switch means 42, for example a touch sensor, for turning on the power source 43 only when the hand of an operator is contacted with the body of the mouse 5.

The mouse data is converted to an analog signal by the mouse serial data voltage converter 28 and is entered to the voltage controlled oscillator 36 as a control voltage. The mouse data is FM-modulated, amplified by a buffer amplifier 41 and transmitted via a transmitting antenna 13. The transmitting antenna 13 is preferably an internal type located within the body of the mouse 5.

Figure 2:
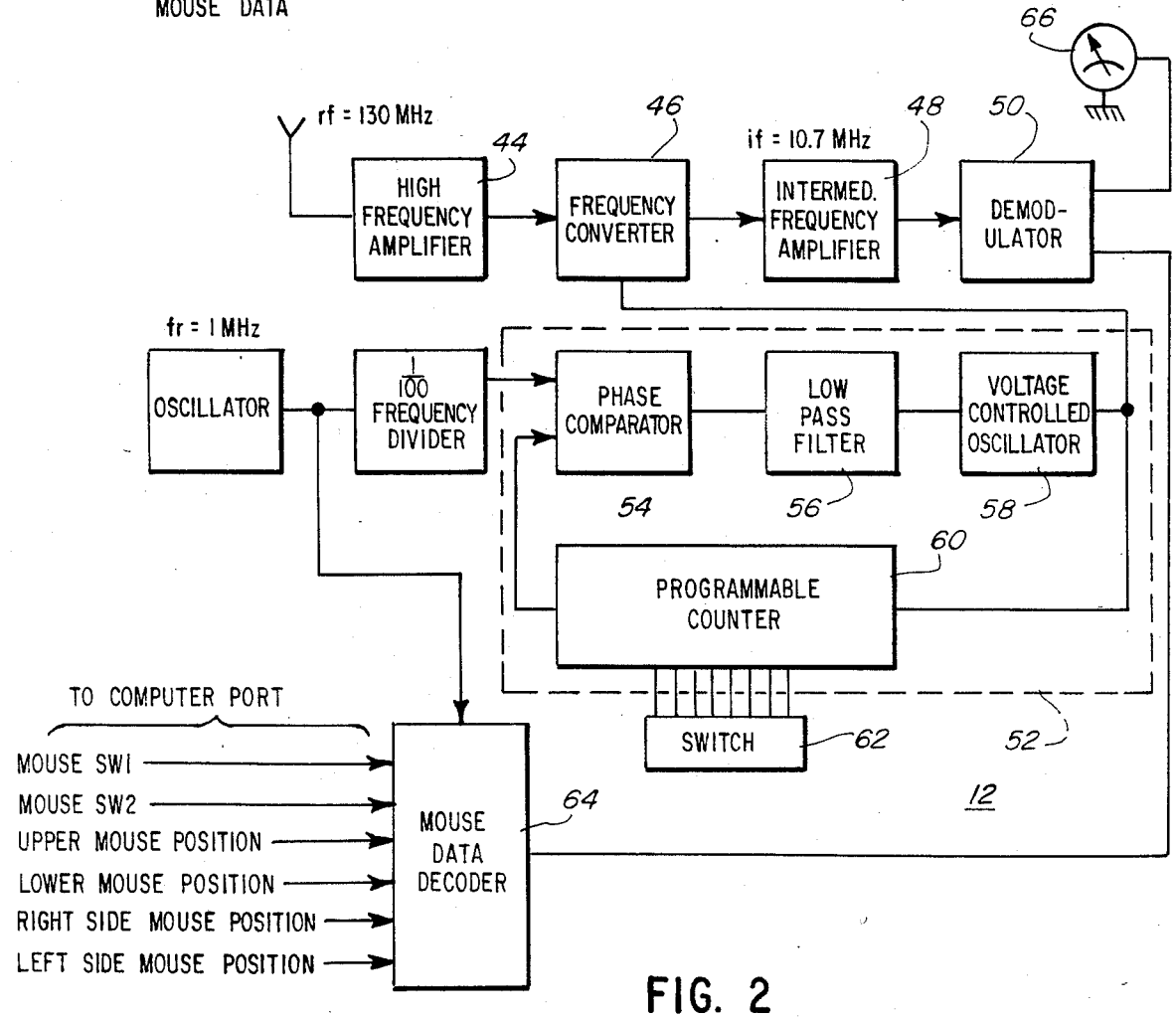
FIG. 2 is a block diagram illustrating circuitry of a receiver.

Referring now to FIG. 2, illustrated generally is a block diagram of the receiver 12 which is coupled to the host computer 5 (FIG. 4). As indicated above, the receiver 12 comprises the receiving antenna 11, a high frequency amplifier 44, a frequency converter 46, an intermediate frequency amplifier 48, and a demodulator 50.

A phase locked loop circuit 52, comprising a second phase comparator 54, a second low pass filter 56, a second voltage controller oscillator 58, a second programmable counter 60 and a second switch 62 is operated in a similar fashion to the first phase locked loop circuit 30 described above in conjunction with FIG. 1 and the transmitter circuitry 10. Thus for reception of the radio wave signal R transmitted by the mouse 9, the receiver 12 is tuned to the same carrier frequency as the radio wave signal R. Hence the first programmable counter 38 and the second programmable counter 60 are set to the same value.

The receiver 12 receives the time series analog signal transmitted by the mouse 9 and the demodulator 50 demodulates the signal. The mouse data decoder 64 receives the demodulated analog mouse data signal and demultiplexes and digitizes same. Outputs of the mouse data decoder 64 are coupled to input ports of the host computer 5, which receives the digital mouse data.

A mouse level meter 66 indicates the signal strength of the received radio wave signal R.

Referring now to FIG. 5, illustrated is a front panel of the receiver 12. The mouse level meter 66, as indicated above, displays signal strength of the radio wave signal R. A channel display 68 indicates the frequency at which the receiver 12 is currently tuned.

It is desired to provide an interface for enabling the application of the present invention to computers of any architecture. It is possible to associate the receiver 12 in the body of the host computer 5.

In the embodiment described above, FM modulation has been described. However, the present invention is not limited to FM modulation, rather other modulation formats such as phase modulation or pulse width modulation may be employed. Further a radio wave mouse apparatus may have individual channels for each of the signals comprising the mouse data rather than multiplexing the signals.

According to the present invention as described above, the radio wave mouse apparatus is improved in operability, thereby remarkably improving the operating efficiency of a personal computer.

I claim:

1. In a computer system comprising a computer having a keyboard and a display device connected to the computer, an improved position indicator means comprising:

a mouse having means responsive to movement thereof over a support surface for generating electrical signals indicating the position of the mouse;

power source means carried by the mouse;

circuit means, including a selectable frequency-setting means, carried by the mouse and powered by said power source means for generating frequency modulated radio signals corresponding to said electrical signals;

an antenna within said mouse for transmitting said generated radio signals; and processing means associated with said computer for receiving the transmitted radio signal and converting said radio signal into a display on said display device, said power source, circuit means, and antenna being cooperatively arranged to provide a transmitting output sufficient to effectively transmit said signals to said processing means to cause said display to be accurately positioned on said display device corresponding to the positioning of said mouse notwithstanding changes in the directional positioning and noncontinuity in the line-of-sight path between said antenna and the processing means.

2. The computer system of claim 1 wherein said display comprises a cursor.

3. The computer system of claim 1 wherein said means for generating said radio signal includes switch means.

4. The computer system of claim 1 wherein said circuit means are associated with said power source means for selectively connecting the power source means to said circuit means.

5. The computer system of claim 1 wherein said circuit means includes means for selectively causing the carrier frequency of said radio signals to be any one of a plurality of different frequencies.

6. The computer system of claim 1 wherein said circuit means includes manually operable means for selectively causing the carrier frequency of said radio signals to be any one of a plurality of different frequencies.

7. The computer system of claim 1 wherein said circuit means includes means for selectively causing the carrier frequency of said radio signals to be any one of a plurality of different frequencies and said processing means includes means for selectively processing any one of said plurality of different frequencies.

8. The computer system of claim 1 wherein said circuit means includes means for selectively causing the carrier frequency of said radio signals to be any one of a plurality of different preselected frequencies.

9. The computer system of claim 1 wherein said circuit means includes a switch carried by the mouse and said frequency modulated radio wave signals correspond to said electric signals and the arrangement of said switch.

10. The apparatus of claim 1 further comprising:
    data encoding means for sampling said electrical signals to provide a time series digital signal; and
    a digital-to-analog converter for converting said digital signal into an analog voltage for use in generating said modulated radio wave signals, said radio transmitting means having a voltage controlled oscillator using the converted analog voltage as the control voltage therefor.

11. The apparatus of claim 10 wherein said FM transmitter comprises a variable frequency transmitter and said radio transmitting means includes a selection switch arranged to be selectively set to a desired transmitting frequency.

12. The apparatus of claim 1 further comprising power source switch means for connecting the radio signal transmitting means to the power source means only when the hand of an operator is juxtaposed to the mouse.

13. The apparatus of claim 9 further comprising interface means connected to said receiving means for providing any one of a plurality of different forms of the converted radio signal for selective use by computers having different preselected corresponding architectures.

* * * * *